Patented Jan. 7, 1947

2,414,018

UNITED STATES PATENT OFFICE 2,414,018

RUBBER DERIVATIVES

Clarence M. Carson, Cuyahoga Falls, Ohio, assignor to Wingfoot Corporation, Akron, Ohio, a corporation of Delaware No Drawing. Application July 28, 1943, Serial No. 496,433

2 Claims. (Cl. 260—734)

This invention relates to the stabilization of cyclized rubbers. More particularly, it relates to the stabilization of a cyclized rubber which is produced by treatment of a rubber solution with the halide of an amphoteric metal or a derivative thereof, such as chlorostannic acid, with recovery of the rubber derivative by suspending the solution of the product in water and then removing the solvent by distillation. The reaction is carried out in the substantial absence of air. The cyclized product is readily oxidized.

According to this invention the cyclized product, whether oxidized or not, is stabilized by the admixture therewith of a reaction product of an alkylene polyhalide and a primary amine which may be aliphatic, cycloaliphatic or ring substituted. The stabilizer may be a mixture of compounds or it may be a relatively pure compound such as a substituted piperazine. A preferred class of stabilizers is the N,N'-dialkyl piperazines such as N,N'-di-o-methyl cyclohexyl piperazine.

The best known cyclized rubbers are the Pliolite products produced by The Goodyear Tire & Rubber Company. Some of these are marketed in a substantially unoxidized condition as, for example, Pliolite 29,900 which has a distortion point of about 50-60° C. Pliolite P1233 and P1230 contain several per cent of oxygen, for example, around 1 or 2 per cent more than the unoxidized product. P1233 has a distortion point around 5-35° C., and P1230 has a distortion point around 50-60° C. Pliolite 29,900 is the product obtained by milling the fine powder deposited on evaporation of solvent from the emulsified solution as above described. P1230 is obtained by partial oxidation of the milled product, 29,900, in subdivided form; for example, that which passes through a sieve containing 2 meshes per inch and is retained on a sieve having 10 meshes per inch.

The distortion point is determined as follows: The dried reaction product in its unmilled or powdered state is molded by heat and pressure into a sheet 10 inches square and ⅛ inch thick. One-inch strips are cut from this sheet. These are placed on two fulcrums 1 inch high and 8 inches apart. The fulcrums are immersed in a water bath. The temperature of the water bath is raised 1° C. per minute. At each minute the strip of molded sheet is pushed down at the midpoint between the fulcrums until it reaches the bottom of the bath. The pressure is immediately released. When the strip softens to the point where it does not return to its original straight position, the temperature is noted, and this is called the distortion point.

The various Pliolites, including those of higher and lower softening point, may be compounded with a variety of ingredients, including waxes, resins, plasticizers, etc. The addition of such ingredients is usually carried out by dissolving them with Pliolite in a suitable solvent such as toluol, gasoline, etc. in any one of several well known mechanical mixers. The stabilizer is advantageously added in a similar manner.

The stabilizers or inhibitors of this invention include the substantially permanent and non-fugitive reaction products of alkylene polyhalides and primary aliphatic, cycloaliphatic, and ring-substituted amines. For instance, from an ethylene dihalide and an amine one may obtain substituted ethylene diamines and piperazines according to the following equations:

(1) 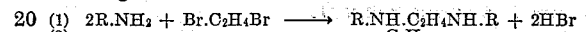
(2) 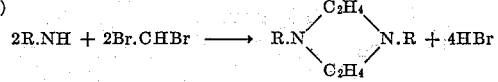

These reactions proceed simultaneously and both types of products are obtained. Complex reactions also take place. For instance, amino ethylene bromide formed according to the following equation:

(3) $R.NH_2 + Br.C_2H_4Br \longrightarrow Br.C_2H_4NH.R + HBr$ when reacted with the substituted ethylene diamine resulting from equation (1) gives a diethylene triamine in the following manner:

(4) 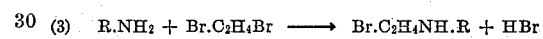

A triethylene tetramine may be formed by any of the following processes:

(5) 
(6) 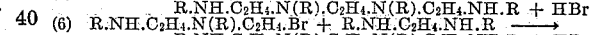
(7) 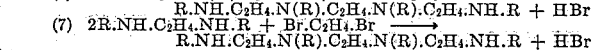

By successive reactions similar to those above, these ethylene polyamines may build up to compounds of very high molecular weight.

Cyclic compounds of high molecular weight may be similarly formed by joinder of the terminal secondary amino groups by reaction with ethylene bromide. It is also possible that other types of reactions take place. A composite product need not be broken down into its substituents to produce a stabilizer because the composite product is an effective stabilizer. The reaction may be carried out to produce a dialkyl piperazine such as a dimethyl or diethyl piperazine, etc., or a dicyclohexyl piperazine or a dialkyl-disubstituted polyalkylene polyamine such as a substituted diethylene triamine, triethylene tetramine, tetraethylene pentamine, etc., or other like polyalkylene tri-, tetra-, penta-, etc., amine.

The following examples illustrate the preparation of suitable stabilizers:

EXAMPLE 1

Two hundred eighty-two parts (2.5 mols) of o-methyl cyclo-hexylamine were placed in a reactor equipped with a stirrer, a reflux condenser and a thermometer and the charge of 192 parts (1.02 mol) of ethylene dibromide was run in slowly and was allowed to react. A portion (5-10% of the total) of the caustic used to neutralize the hydrobromic acid formed in the reaction was then added. (This caustic solution was made by dissolving 80 parts of sodium hydroxide in 150 parts of water.) The ethylene dibromide and caustic were thereafter alternately added in small portions (5-10% of the total), allowing time for reaction after each addition, the reaction mixture being kept at a gentle reflux temperature of about 110° C. After about three hours, the lower aqueous layer containing sodium bromide was separated from the upper oily layer. The latter was distilled at 10-12 mm. pressure to obtain 86 parts of unreacted o-methyl cyclohexylamine, which was recovered below 170° C. A fraction amounting to 214 parts was obtained at 170-270° C. This was redistilled at 10 mm. pressure to give 192 parts of a mixture of N,N'-di(o-methyl cyclohexyl) ethylene diamine and N,N'-di(o-methyl cyclohexyl) piperazine recovered over a temperature range of 180-215° C. At 215-259° C., 21 parts of a brownish sirupy liquid were obtained. This was a mixture of "High boilers" suitable for the stabilization of Pliolite (cyclized rubber).

EXAMPLE 2

Two hundred two parts (2 mols) of tetrahydro furfurylamine, 188 parts (1 mol) of ethylene dibromide, and a solution of 90 parts of sodium hydroxide dissolved in 180 parts of water were reacted by the method outlined in Example 1. The product was distilled at 10-12 mm. pressure to yield the following fractions:

|   | Parts |
|---|---|
| 1. Up to 160° C | 90 |
| 2. 160-220° C | 74 |
| 3. 220-270° C | 53 |

As before, fraction 2 contained the ethylene diamine and piperazine derivatives. Fraction 3 contained high molecular compounds having the desired stabilizing properties.

EXAMPLE 3

One hundred thirteen parts (1 mol) of 3-methyl cyclohexylamine, 188 parts (1 mol) of ethylene dibromide and a solution of 90 parts of sodium hydroxide dissolved in 170 parts of water were reacted as follows:

The amine was heated to 140°, ethylene dibromide was added in small portions, the temperature slowly rising to 175° C. When about half of the total ethylene dibromide had been added, crystals of the amine hydrobromide began to form. The mixture was then cooled to 120° C. and one-third of the caustic was added. The remainder of the ethylene dibromide was then slowly added and the mixture was refluxed for about one hour, after which the remainder of the caustic was added and the refluxing was continued for another hour. The oily reaction product was separated from the aqueous sodium bromide layer and was distilled at 10 mm. pressure. About 66 parts of the desired high-boiling constituents were obtained at 200-300° C., and 10 parts of still higher boiling material were obtained as residue boiling above 300° C. Both of these fractions may be used as photochemical stabilizers.

EXAMPLE 4

Four hundred fifty-two grams (4 mols) of o-methyl cyclohexylamine were reacted with 564 grams (3 mols) of ethylene dibromide as follows:

The amine was placed in a flask equipped with a stirrer, a reflux condenser, and a dropping funnel and heated to about 125° C. Ethylene bromide was then slowly added through the dropping funnel. To prevent crystallization of amine hydrobromide formed during the reaction, a few cc. of water were added through the condenser from time to time. When about half the ethylene dibromide had been added, the mixture was heated to 120-130° C. for 10 minutes and about 90 grams of sodium hydroxide dissolved in 167 cc. of water were slowly added. The remainder of the ethylene dibromide was added as before and, after heating 10-15 minutes at 115-150° C., about 180 grams of sodium hydroxide dissolved in 334 cc. of water were slowly added. The mixture was then maintained at 115-120° C. for one hour. The oily layer was separated from the aqueous layer and distilled at 6-7 mm. pressure. Eighty grams of material were obtained below 160° C., 257 grams, consisting largely of N,N'-di(o-methyl cyclohexyl) ethylene diamine, came over at 160-205° C., and the residue weighed 205 grams. The residue was a brown oil, which become viscous on cooling and consisted of a mixture of "high-boilers" useful as photochemical inhibitors. Distillation of the residue at 3-5 mm. pressure gave a major fraction boiling at 235-240° C., which may be used as a photochemical stabilizer.

EXAMPLE 5

The N,N' di(o-methyl cyclohexyl) ethylene diamine obtained in Example 4 in the 257 gram fraction boiling at 160-205° C. at 6-7 mm. pressure can be utilized in preparing succeeding batches of "high-boilers," as illustrated in the following procedure. Three hundred seventy-five grams (1.5 mols) of N,N' di(o-methyl cyclohexyl) ethylene diamine, 339 grams (3 mols) of o-methyl cyclohexylamine, and 564 grams (3 mols) of ethylene dibromide were reacted, using a solution of 270 grams of sodium hydroxide dissolved in 500 cc. of water to absorb the hydrobromic acid formed. The mixed amines were heated to about 120° C. and one-half of the ethylene dibromide was slowly added, also adding a few cc. of water from time to time to prevent crystallization. The mixture was heated at 125-130° C. for 10-15 minutes and about ⅓ of the caustic solution was slowly added. The remainder of the ethylene dibromide was then slowly added followed by the remainder of the caustic solution.

The mixture was heated, with stirring, for one hour at 115-120° C. The oily layer was washed with water and distilled at 5-6 mm. pressure to obtain the following fractions:

|   | Grams |
|---|---|
| Below 160° C | 24 |
| 160-205° C | 378 |
| Residue | 262 |

The residue consisted of a mixture of compounds suitable for use as photochemical stabilizers.

EXAMPLE 6

A mixture of 200 grams of N,N' di(o-methyl cyclohexyl) ethylene diamine, 135 grams of o-methyl cyclohexylamine, 99 grams of ethylene dichloride, and 200 cc. of water was placed in a steel autoclave and heated at 200° C. for one-half hour. The reaction mixture was cooled to about 100° C., at which temperature it was completely liquid, and was treated with a mixture of 90 grams of sodium hydroxide and 100 cc. of water and boiled for one-half hour. The oily portion was then separated, washed with water and distilled at 5 mm. pressure to give the following fractions:

|  | Grams |
|---|---|
| Below 160° C | 56 |
| 160–210° C | 221 |
| Residue | 65 |

The residue was a brown, viscous oil possessing the desired photochemical inhibiting properties.

EXAMPLE 7

Eight hundred grams (8.1 mols) of cyclohexylamine, mixed with 100 cc. of water, were treated with 564 grams (3 mols) of ethylene dibromide at a temperature rising from 100° C. to 120° C. Then about ⅓ of a solution of 540 grams of sodium hydroxide dissolved in 1000 cc. of water was added, followed after heating and stirring for 10–15 minutes by a second portion of 564 grams (3 mols) of ethylene dibromide and finally the remainder of the caustic solution. The mixture was stirred and heated at 115–120° C. for one hour. The oily product was separated, washed with water, and distilled at 5 mm. pressure to yield the following fractions:

|  | Grams |
|---|---|
| Below 150° C | 127 |
| 150–217° C | 683.5 |
| Residue | 152 |

The residue was a brown, viscous mixture of the desired photochemical inhibitors.

EXAMPLE 8

Seventy-six parts of diethylene triamine, 310 parts of butyl bromide and a solution of 90 parts of sodium hydroxide dissolved in 200 parts of water were reacted by the method of Example 1. The reaction product was distilled at 4–5 mm. pressure, one hundred fifteen parts of the desired butyl diethylene triamines being obtained at 160–200° C. It may be used as an inhibitor.

The foregoing examples are illustrative of the materials useful in the invention and of methods of preparing them. Other alkylene polyhalides may be used in place of the ethylene dibromide and ethylene dichloride of Examples 1–7 and other primary aliphatic amines may be employed instead of the amines there used.

Representative examples of other alkylene polyhalides which may be used are n-propylene dibromide, 1,2-dibromopropane, 1–2, 1–3 and 1–4 dichlor or dibrom butane, the di- or tri-halogen derivatives of the pentanes, dichlorhydrin, di-(chlorethyl) ether, and homologues of these compounds. Of these materials, those compounds in which the alkylene groups are hydrocarbon groups are preferred.

Any primary amine may be employed, including straight or branched chain aliphatic amines, cycloaliphatic amines, such as cyclohexylamine, and ring-substituted aliphatic amines, such as benzyl amine and furfurylamine. Further examples of suitable amines are the butylamines, the amylamines, tetrahydrofurfurylamine, o-, m-, and p-methyl cyclohexylamine, the hexahydro xylidenes, o- cyclohexyl cyclohexylamine, 2,4 dimethyl cyclohexyl amine, 3,3,5-trimethyl cyclohexylamine, the heptylamines, the nonylamines, the hexahydrophenetidines, the decahydronaphthylamines, the ac-tetrahydro naphthylamines, allylamine, b-cyclohexyl ethylamine, the aliphatic amino alcohols, b-phenyl ethylamine, etc., which may also contain various neutral or basic substituents such as amino, hydroxyl, alkoxy, aryloxy, etc. radicals. Those amines in which the aliphatic group is hydrocarbon are preferred. The cyclohexyl piperazines which may be formed by such a reaction and which are satisfactory stabilizers include in addition to N, N'-di-o-methylcyclohexyl piperazine, the following: N, N'- di- m- methylcyclohexyl piperazine, N,N'- di-p- methylcyclohexyl piperazine and N, N'-dicyclohexyl piperazine.

When materials coming within the invention are prepared by the method represented by Equations 8 and 9 and Example 8, various polyalkylene polyamines such as diethylene triamine, triethylene tetramine, tetraethylene pentamine, dipropylene triamine, dibutylene triamine, etc., may be reacted with any halide such as the butyl bromides, the amyl bromides, benzyl bromide, cyclohexyl chloride and other aliphatic, cycloaliphatic, and ring-substituted halides corresponding to the amines listed in the preceding paragraph. Those compounds in which the alkylene or amine-substituted groups are hydrocarbon are preferred.

In view of the varied courses which the reaction may take, substantially any proportions of reactants may be employed. Also, the temperature, pressure and other conditions of the reaction may be varied greatly while still obtaining materials coming within the invention.

The reaction mixture may be divided into fractions or separated into components and utilized as such but may also be used without any such separation into parts and the resultant after such separation may be used as an inhibitor.

The amount of stabilizer or inhibitor employed will vary. In general, the use of 2 to 4 percent with a partially oxidized Pliolite such as P1230 or P1233 will prevent spontaneous oxidation of the rubber derivative after the controlled oxidation has been completed. This is manifest by the improved retention of heat-sealing properties by the rubber derivative and the longer protection the rubber derivative affords as a barrier to the transfer of moisture vapor when applied to Cellophane, paper or the like.

The stabilizer may be milled into the rubber derivative and subsequently dissolved with wax or other modifying agent in any suitable solvent. When the stabilizer is added by milling, the temperature of the rubber derivative may be around 250° F.

The stabilized rubber derivative may be used for painting steel, enamels, etc., and, particularly, for moisture-proofing wrapping materials, such as foil, paper, regenerated cellulose, and other cellulose derivatives, etc. It renders the wrapping materials moisture proof and makes them heat sealable.

The following examples illustrate the use of the stabilizer in various types of compositions containing the rubber derivative:

Example A

*Coating for metal foil*

| | Parts |
|---|---|
| Pliolite P1233 | 15 |
| Paraffin (148–150° F.) | 1.5 |
| n-n'-Di(methyl cyclohexyl)piperazine | 0.6 |
| Rubber solvent gasoline | 82.9 |

The coated metal foil has greater resistance to the passage of moisture vapor than the uncoated foil, and the foil is rendered heat sealable by the use of this coating. Paraffins of other softening points and various other waxes may be substituted for that given in the formula. Other solvents may be employed, such as toluol and other aromatics, mixtures of aromatics and aliphatics or hydrogenated naphthas, such as Solvesso (produced by the Standard Oil Company of Ohio), or the solvents known in the trade as Union Oil aromatics may be used.

Example B

| | Parts |
|---|---|
| Pliolite P1233 | 100 |
| n-n'-Di-o-methyl cyclohexyl piperazine | 4 |

These two ingredients are milled together. Twenty parts of the milled mixture are then further mixed with 3 parts of paraffin (134° F.) and 77 parts of "rubber solvent gasoline."

This coating may be used on glassine and foils to which its adhesion is excellent. It may be used to laminate other materials to foil—for example, Cellophane, cellulose acetate, Pliofilm (rubber hydrochloride manufactured by The Goodyear Tire & Rubber Company), etc. In spreading on foil, the rubber derivative is usually preferably applied from solution in a gasoline solvent. In lamination, partial drying takes place, and the lamination is then made with warm rollers.

Example C

The mixture compounded according to this formula may be used for coating printed or lithographed labels. It does not discolor in summer sun.

| | Parts |
|---|---|
| Pliolite P1230 | 20 |
| Cumar R3 | 5 |
| Paraffin (134° F.) | 3 |
| n-n'-Di-o-methyl cyclohexyl piperazine | 0.4 |
| Rubber-solvent gasoline | 71.6 |

The cumar R3 improves the gloss. Other gloss-improving resins may be used.

Example D

The stabilizer may be used with unoxidized cyclized rubber, such as 29,900 to prevent embrittlement. In the protection of wood, metal, cloth, and some types of paper where the heat-sealing properties and adhesion of the rubber derivatives are not too important, it may be advisable to use the unoxidized rubber derivative. When exposed to sunlight, such a coating will flake off and crack when folded much more readily than the partially oxidized product. The following formula illustrates such a product:

| | Parts |
|---|---|
| Pliolite 29,900 | 20 |
| Paraffin (134° F.) | 3 |
| n-n'-Di-o-methyl cyclohexyl piperazine | 0.4 |
| Toluol | 76.6 |

Example E

| | Parts |
|---|---|
| Pliolite P1233 | 20.0 |
| Paraffin (134° F.) | 3.0 |
| Reaction mixture of Example 1 (B. P. 215–259° C.) | 0.4 |
| Rubber solvent gasoline | 76.4 |

This coating may be applied to glassine, using, for example, about 2.5 pounds of the rubber derivative per 3,000 square feet of paper. Bags may be formed from such a sheet by merely uniting edges of the coated surfaces by the application of heat and pressure. The seal thus formed is permanent for the life of most foodstuffs. The coated glassine sheet may be stored in roll form and as long as it is kept away from the sun and air—for example, by storing in the form of a roll—it does not lose its ability to be heat sealed, nor does it lose its resistance to the passage of moisture vapor. The addition of the stabilizer prolongs the heat-sealing life of the rubber derivative.

The coating of Example E may also be applied to metal foil, etc.

Example F

Such a composition may similarly be stabilized by using the reaction mixture of Example 1 without first separating the piperazine derivative, thus:

| | Parts |
|---|---|
| Pliolite P1233 | 20.0 |
| Paraffin (134° F.) | 3.0 |
| Stabilizer | 0.4 |
| Toluol | 76.6 |

Using toluol, or rubber solvent gasoline or other suitable solvent such a coating may be applied to foil, paper, etc., and the heat-sealing and moistureproofing properties of the coating will be found to have longer life than if no stabilizer is added.

This application is in part a continuation of my application Serial No. 311,945, filed December 30, 1939.

What I claim is:

1. A cyclized rubber derivative which has admixed therewith a small amount of N-N'-di-o-methyl cyclohexyl piperazine, the whole being suspended in toluol.

2. A cyclized rubber derivative which has admixed therewith a small amount of N-N'-di-o-methyl cyclohexyl piperazine, the whole being suspended in a saturated-hydrocarbon solvent.

CLARENCE M. CARSON.